United States Patent Office 2,858,327
Patented Oct. 28, 1958

2,858,327

S-ALKYL DIARYL PHOSPHINOMONOTHIOATES AND METHODS FOR PREPARING SAME

William A. Higgins, Cleveland Heights, and Thomas Robert Hopkins, Willoughby, Ohio, assignors to The Lubrizol Corporation, Wickliffe, Ohio, a corporation of Ohio No Drawing. Application January 26, 1954
Serial No. 406,329

7 Claims. (Cl. 260—461)

This invention relates to new chemical compounds and methods for the preparation of such compounds. In a more specific sense it relates to esters of certain phosphorus- and sulfur-containing acids.

It is a principal object of this invention to provide new compositions of matter. Another object is the preparation of these novel compositions by an economical and convenient process. Other objects will be apparent from the ensuing description of the invention.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

In accordance with the invention new phosphorus- and sulfur-containing esters have been prepared. Such esters are useful in many applications, but find their principal utilization as additives for motor oils and gear lubricants and as plasticizers for vinyl polymers.

Broadly stated, the new chemical compounds of this invention are the aliphatic esters of di-aromatic phosphinomonothioic (monothiophosphinic) acids represented by the following structural formula:

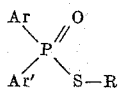

where Ar and Ar' are the same or different aromatic radicals and R is an aliphatic radical.

In the new chemical compounds, Ar and Ar' are the same or different aromatic radicals bound to phosphorus through a benzenoid carbon atom, preferably the aromatic hydrocarbon radicals, including aryl radicals. Typical examples of aromatic radicals are phenyl, tolyl, xylyl, chlorophenyl, bromophenyl, nitrophenyl, methoxy phenyl, ethoxy phenyl, ethylphenyl, isopropylphenyl, amylphenyl, diamylphenyl, kerylphenyl, waxphenyl, eicosylphenyl, diisobutylphenyl, dodecylphenyl, α-naphthyl, β-naphthyl, amylnaphthyl, butynaphthyl, kerylnaphthyl, chloronaphthyl, methoxynaphthyl, etc.

In the new chemical compounds, R is an aliphatic radical, although the aliphatic hydrocarbon radicals are preferred for purposes of this invention. Examples of R in the above formula are the following monovalent radicals: n-butyl, sec-amyl, tert-amyl, 2-methyl pentyl-4, n-amyl, n-hexyl, 2-hexyl, 3-hexyl, 2-methyl-hexyl, 3-methylhexyl, 2-methylamyl, n-octyl, 2-ethylhexyl, diisobutyl, n-nonyl, 2-octyl, 3,3,5-trimethylhexyl, n-decyl, isodecyl n-undecyl, n-dodecyl, polypropyl, triisobutyl, etc. Also the substituted hydrocarbon radicals may be used, e. g., radicals possessing halogen, nitro, or ether substituents. Likewise, polyvalent aliphatic radicals derived from polyhydric alcohols, such as, ethylene glycol, glycerol, propylene glycol, pentaerythritol, etc. may be employed.

The new chemical compounds are prepared by the process which comprises reacting at least one di-aromatic phosphinomonothioic acid with at least one alcohol in the presence of at least one aromatic sulfonic acid. The di-aromatic phosphinomonothioic acids posses two aromatic radicals bonded to phosphorus through a benzenoid carbon atom, preferably aromatic hydrocarbon radicals, including aryl radicals. Examples of aromatic radicals are given above.

The di-aromatic phosphinomonothioic acids may be prepared by a number of different methods. One suitable preparation is the hydrolysis of di-aromatic phosphinothioic chlorides with aqueous alkali. Another preparation is the saponification of di-aromatic dithiophosphinic acid esters.

The alcohol employed in the process may be any aliphatic alcohol, including the alkanols. Examples of these are substituted and unsubstituted monohydric alcohols, e. g., butyl, amyl, hexyl, 4-methyl-pentyl-2, heptyl, n-octyl, capryl, nonyl, 2-ethyl-hexyl, lauryl, tetradecyl alcohol, etc.; substituted aliphatic monohydric alcohols, e. g.: chloro-hexyl, amino-octyl, etc.; substituted cycloaliphatic monohydric alcohols; aromatic substituted aliphatic monohydric alcohols; cycloaliphatic substituted aliphatic alcohols; and the various polyhydric alcohols, e. g.: ethylene glycol, propylene glycol, butylene glycol, glycerol, pentaerythritol, etc.

The aromatic sulfonic acid employed in the process acts as a catalyst. It is preferably an aromatic ring sulfonic acid and most desirably a benzene ring sulfonic acid, such as, e. g. p-toluene sulfonic acid. Other aromatic ring sulfonic acids which can be employed would include, e. g., benzene sulfonic acids, ethyl benzene sulfonic acids, tertiary-butyl benzene sulfonic acids, octyl benzene sulfonic acids, naphthalene sulfonic acids, etc.

The period of heating will usually extend beyond an hours, and in some instances, particularly when the temperature of the reaction mixture is low, this period necessarily will be much longer, sometimes up to 20 hours being required for a maximum yield of phosphinomonothioate ester.

The temperature of the reaction mixture may be varied over a wide range, and when the boiling point of the alcohol is within or near this range it is convenient and appropriate to heat the reaction mixture at the temperature of the refluxing alcohol. The range of operable temperatures appears to have as its approximate lower limit, 100° C. This is not to imply that lower temperatures are entirely unsatisfactory, but at lower temperatures the reaction proceeds at such a rate that the process is not economically attractive. For this reason it is preferred to carry out the reaction at temperatures above 100° C., and especially preferred temperatures are in the region above 125° C. It will be seen that the process is particularly applicable to the higher boiling (and correspondingly higher molecular weight) alcohols by virtue of this temperature limitation, inasmuch as the utilization of lower boiling (i. e., below 100° C.) alcohols involves either inordinately long reaction times or the use of superatmospheric pressure.

Isolation of the ester from the product mixture usually involves washing with an aqueous alkaline solution to remove unchanged phosphinomonothioic acid, drying, and, optionally, subsequent distillation of the desired ester.

The structure of a phosphinomonothioic acid with regard to the relative positions of the sulfur and oxygen has not been established with certainty. In some instances such an acid behaves as though it existed as A, while in other environments such an

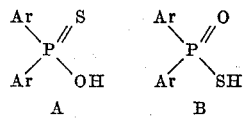

acid behaves as though it existed as B. It will be seen that in the absence of evidence, the esterification of a phosphinomonothioic acid with an alcohol will yield a product, the identity of which is not obvious. Thus, such a product may be the ester either of A or B shown above. That the products of the invention described herein are esters of phosphinomonothioic acids as represented by B, or S-substituted esters has been shown by the alkaline hydrolysis of such an ester. The products of such a hydrolysis included a

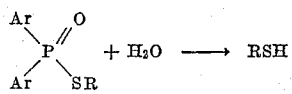

substantial proportion of a mercaptan which was identified by odor, boiling point, etc. A mercaptan could originate only from an S-substituted ester and thus was established the identity of the esters described herein.

To illustrate in more detailed fashion the process and products of this invention the following examples are offered.

*Example 1*

A mixture of 112 grams (0.43 mole) of ditolylphosphinomonothioic acid, 170 grams (1.3 moles) of 2-ethylhexanol and 25 grams of p-toluenesulfonic acid was heated at reflux temperature for three hours, then allowed to cool. The cooled solution was washed with aqueous potassium hydroxide and dried over magnesium sulfate. The dry material was concentrated by heating it to a final temperature of 170° C./5 mm., the residue weighed 80 grams and was identified as S-2-ethylhexyl ditolylphosphinomonothioate by the following analyses:

|  | Percent |
|---|---|
| Sulfur | 8.8 |
| Phosphorus | 8.9 |

*Example 2*

A mixture of 117 grams (0.5 mole) of diphenylphosphinomonothioic acid, 195 grams (1.5 moles) of n-octyl alcohol and 5 grams of p-toluenesulfonic acid was heated at 170° C. for 3.5 hours, then cooled and diluted with ligroin. This mixture was washed first with five percent aqueous sodium bicarbonate, then with water, and the resulting material was dried. The dry material was concentrated by heating to a final temperature of 150° C./0.2 mm. The residue weighed 169 grams; a small sample was distilled at 202° C./0.15 mm. and the distillate, S-n-octyl diphenylphosphinomonothioate, was shown to have the following analyses:

| $n_D^{24}$ | 1.5700 |
|---|---|
| Sulfur _____percent | 9.6 |
| Phosphorus _____do | 8.9 |

*Example 3*

To a mixture of 234 grams (1 mole) of diphenylphosphinomonothioic acid and 390 grams (3 moles) of 2-ethylhexanol, at 140° C., there was added 12 grams of p-toluenesulfonic acid and the resulting mixture was heated at reflux temperature for three hours. Another 12 grams of p-toluenesulfonic acid was added and the mixture was heated at reflux temperature for another three hours. The cooled ester was washed with aqueous sodium bicarbonate, then with water, and then it was dried over magnesium sulfate. The dry material was concentrated by heating to a final temperature of 215° C./1.4 mm. The residue was distilled at 200–240° C./1.0 mm. to yield 145 grams of a yellow distillate, S-2-ethylhexyl diphenylphosphinomonothioate, which showed the following analyses:

|  | Percent |
|---|---|
| Sulfur | 10.2 |
| Phosphorus | 8.5 |

*Example 4*

A mixture of 58.5 grams (0.25 mole) of diphenylphosphinomonothioic acid, 135 grams (1.0 mole) of 2-octanol and 3 grams of p-toluenesulfonic acid was heated at 170° C. for six hours, then allowed to cool. The crude material was washed with 10 percent aqueous potassium carbonate, then dried by refluxing with benzene and collecting the water in a distillation trap. The material thus dried was concentrated by heating to a final temperature of 160° C./0.1 mm. The residue was distilled at 186–187° C./0.1 mm. to yield 45 grams of a colorless liquid, S-2-octyl diphenylphosphinomonothioate, which showed the following analyses:

|  | Percent |
|---|---|
| Sulfur | 9.4 |
| Phosphorus | 8.9 |

*Example 5*

A mixture of 58.5 grams (0.25 mole) of diphenylphosphinomonothioic acid, 158 grams (1.0 mole) of n-decyl alcohol and a trace of p-toluenesulfonic acid was heated at 180° C. for six hours, then allowed to cool. The mixture was filtered, washed with aqueous potassium carbonate, and then dried by refluxing with benzene and collecting water in a distillation trap. The dry material was concentrated to a final temperature of 160° C./0.1 mm. and the residue was distilled to yield 70 grams of a colorless liquid distillate, S-n-decyl diphenylphosphinomonothioate, boiling at 212°C/0.1 mm. and showing the following analyses:

|  | Percent |
|---|---|
| Sulfur | 7.7 |
| Phosphorus | 7.4 |

*Example 6*

A mixture of 58.5 grams (0.25 mole) of diphenylphosphinomonothioic acid, 102 grams (1.0 mole) of 2-methyl pentanol-4, and 3 grams of p-toluenesulfonic acid was heated at 130° C. for 12 hours. After the mixture had cooled to approximately room temperature, it was washed with 10 percent aqueous potassium carbonate, dried by refluxing with benzene and collecting water in a distillation trap and concentrated by heating to a final temperature of 100° C./20 mm. The residue was distilled to yield 17 grams of a colorless liquid fraction, S-2-methyl-4-pentyl diphenylphosphinomonothioate, which showed the following analyses:

|  | Percent |
|---|---|
| Sulfur | 9.9 |
| Phosphorus | 9.6 |

Other modes of applying the principle of the invention may be employed, change being made as regards the details described, provided the features stated in any of the following claims, or the equivalent of such, be employed.

We therefore particularly point out and distinctly claim as our invention:

1. As new chemical compound, the monothio esters of phosphinic acid having the formula:

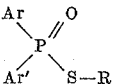

wherein Ar and Ar' are selected from the class consisting of the same and different aromatic radicals bonded to phosphorus through a benzenoid carbon atom, and R is a higher alkyl radical.

2. The method for preparing aliphatic esters of di-aromatic phosphinomonothioic acids having the formula:

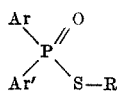

wherein Ar and Ar' are selected from the class consisting of the same and different aromatic radicals bonded to phosphorus through a benzenoid carbon atom, and R is an aliphatic radical; which comprises reacting a di-aromatic phosphinomonothioic acid with an alcohol free of olefinic unsaturation in the presence of an aromatic sulfonic acid.

3. The process of claim 2 wherein said alcohol is an aliphatic alcohol.

4. The process of claim 2 wherein said alcohol is an aliphatic monohydric alcohol.

5. The process of claim 2 wherein said alcohol is an alkyl alcohol.

6. The process of claim 2 wherein said phosphinomonothioic acid is a di-(aromatic hydrocarbon)phosphinomonothioic acid.

7. The process of claim 2 wherein said aromatic sulfonic acid is p-toluene sulfonic acid.

References Cited in the file of this patent

UNITED STATES PATENTS

| | | |
|---|---|---|
| 2,653,161 | Ballard et al. | Sept. 22, 1953 |
| 2,659,714 | Harman et al. | Nov. 17, 1953 |
| 2,665,294 | Kosolapoff | Jan. 5, 1954 |